No. 617,177. Patented Jan. 3, 1899.
O. E. NICKEY.
WATER FILTER.
(Application filed Jan. 22, 1898.)
(No Model.)

WITNESSES:
Edward Thorpe

INVENTOR
O. E. Nickey.
BY
ATTORNEYS.

THE NORRIS PETERS CO., PHOTO-LITHO., WASHINGTON, D. C.

UNITED STATES PATENT OFFICE.

OSCAR EUGENE NICKEY, OF BIG SPRING, TEXAS.

WATER-FILTER.

SPECIFICATION forming part of Letters Patent No. 617,177, dated January 3, 1899.

Application filed January 22, 1898. Serial No. 667,574. (No model.)

*To all whom it may concern:*

Be it known that I, OSCAR EUGENE NICKEY, of Big Spring, in the county of Howard and State of Texas, have invented a new and Improved Water-Filter, of which the following is a full, clear, and exact description.

The object of my invention is to provide a water-filter of exceedingly simple, durable, and economic construction and capable of application to any faucet and which when applied to a faucet need not be removed therefrom for purposes of cleansing, since the arrangement of the water-supply is such that it may be supplied ordinarily to the bottom, passing upward through the filtering material, or may be supplied at the top of the filtering material and passed downward through the same.

The main object of the invention is to provide a receptacle for sediment at the bottom of the filtering-receptacle, or below the bed of filtering material, and to furthermore provide a water-inlet chamber between such receptacle and the lower end of the filtering-bed, so that the water may be passed through the said bed without stirring up the sediment that may be contained in the reservoir at the bottom of the filter.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
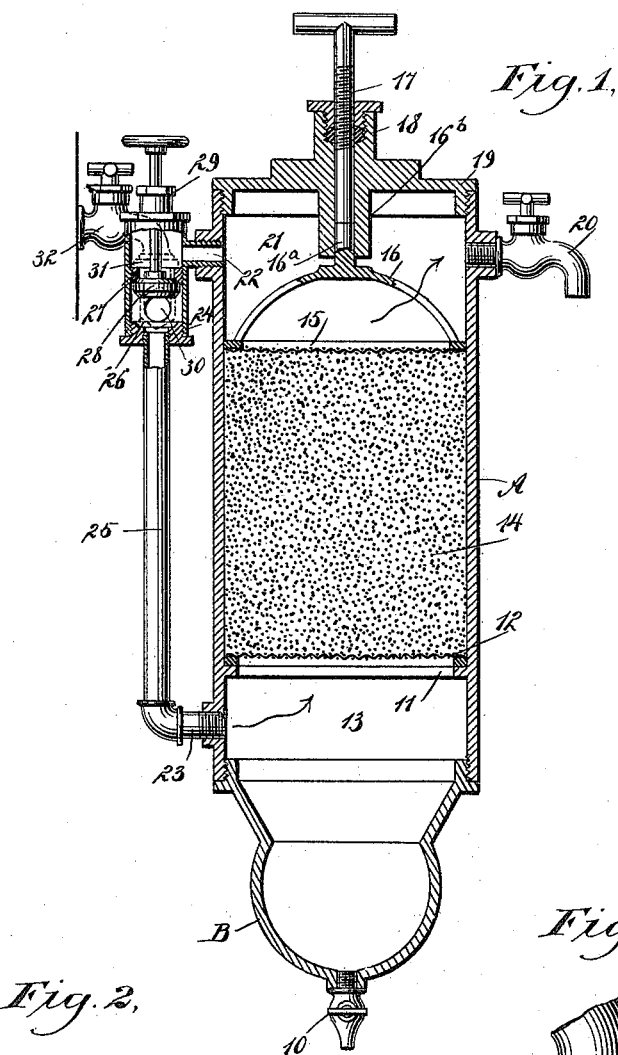
Figure 2:
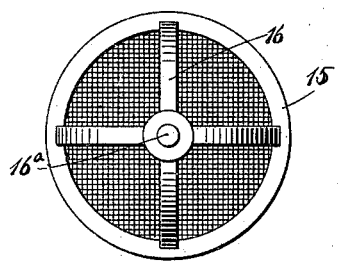
Figure 3:
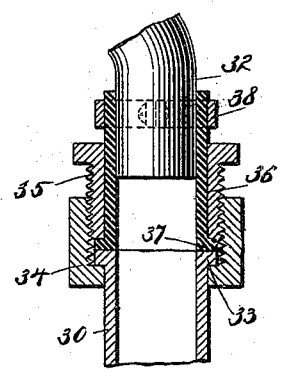

Figure 1 is a vertical central section through the filter. Fig. 2 is a plan view of the upper strainer for the filter; and Fig. 3 is a vertical section through the device employed for attaching the filter to a faucet, illustrating the form of the device when the faucet is without a thread at its mouth.

A represents the body of a filter, which is preferably of cylindrical form and is hollow and of any desired size. At the bottom of the said body A a receptacle B is formed, readily removed from the body, and the receptacle B is adapted to contain sediment. The sediment-receptacle B is usually contracted at its bottom, where it is provided with a drain-cock 10, and the wall of the upper portion of the receptacle is inclined in direction of its contracted section, as is best shown in Fig. 1.

An annular rib 11 is formed upon the interior of the body A at a predetermined point above its lower end, the said rib being used to sustain the strainer 12 of any desired mesh, thus providing a chamber 13 between the sediment-receptacle B and the strainer 12. A bed 14 of filtering material, preferably of charcoal only, rests upon the strainer 12 and nearly fills the said body, a second strainer 15 being placed upon the top of this bed 14, and the top strainer is preferably provided with upwardly-arched ribs 16, and where the ribs connect over the center of the strainer 15 a stud $16^a$ is formed, which is made to enter the lower end of a collar $16^b$, formed upon the inner face of the upper head 19 of the said body, the head 19 being removable. Upon the upper surface of the head 19, over the collar $16^b$, a stuffing-box 18 is formed, in which a pressure-screw 17 is entered, the screw having bearing upon the post $16^a$, so that the bed of filtering material may be rendered as compact as desired.

The faucet 20 from which the filtered water is to be drawn is located at the upper portion of the body and communicates with a chamber 21, which is between the upper strainer 15 and the upper head 19, as shown in Fig. 1. At the opposite side of the body from that at which the faucet 20 is located a thimble 22 is made to enter the upper chamber 21, and a thimble 23 is made to enter the inlet in the lower chamber 13. The lower thimble 23 is connected by a pipe 25 with the lower end of the valve-casing 24, the said valve-casing at a point above its center being connected with the upper thimble 22 or the inlet for the upper chamber 21. The valve-casing is provided with a lower valve-seat 26 and a second valve-seat 27, located between the ends of the valve-casing and below the connection of the said casing with the chamber 21. A valve 28 is mounted to slide between the two seats 26 and 27 and is capable of sealing engagement with either, the stem of the valve-gate 28 being carried upward through the stuffing-box 29 at the upper portion of the valve.

An inlet-pipe 30 is connected with the interior of the valve-casing 24, between the two seats 26 and 27, and when the faucet 32 to which the filter is applied is provided with a thread at its mouth a union 31 may be employed to effect the attachment between the valve-pipe 30 and the said faucet; but when the faucet is smooth at the mouth, as shown in Fig. 3, the pipe 30 is preferably provided at its upper end with a flange 33. A socket 34 is fitted to the flanged end of the pipe, the socket being interiorly threaded to receive a thimble 35, and a rubber or flexible tube 36 is used in connection with the socket and thimble, the said flexible tube having a flange 37 at its lower end, which meets the flange of the pipe 30 and is firmly held between said flange on the pipe 30 and the thimble. The flexible pipe 36 is made sufficiently long to extend beyond the upper end of the thimble and is of such diameter that it may be carried readily over the mouth of the faucet. The flexible pipe is secured to the faucet by means of a clamp 38—a hose-clamp, for example.

In operation the valve 28 is carried to an engagement with the upper seat 27. The water will now pass through the opening in the bottom of the valve-casing through the pipe 25 into the lower chamber 13, and from thence upward through the filtering material to the upper chamber 21, from which it may find an exit through the faucet 20. The sediment or undesirable matter that is removed from the water by passing it through the filtering compound will sink into the sediment-receptacle B, and after becoming settled therein will not be unduly stirred up when the water is drawn from the filter.

When it is desired to wash the filter, the valve 28 is carried to the lower seat 26, the drain-cock is opened, and the water will pass into the upper chamber 21, downward through the filtering material, and out through the drain-cock, carrying all sediment with it.

In the event the water should have oily properties, which would leave a gummy residuum in the filtering material, the upper head 19 of the filter may be removed and hot water poured upon the filtering material, thoroughly cleansing it and the filter. It is obvious that the filtering material may be readily removed when necessary and fresh material substituted.

Having thus described my invention, I claim as new and desire to secure by Letters Patent—

1. In a filter, the combination, with a body provided with an upper and a lower strainer and a bed of filtering material between the two strainers, forming an upper and a lower chamber, of a faucet connected with the upper chamber, through which the water is to be drawn off, a sediment-receptacle constituting the lower end of the body and located below the lower chamber, a valve having a double seat, and means for connection with a source of water-supply, the valve-casing being connected below the two valve-seats with the lower chamber of the body, and above the valve-seats with the upper chamber in the body, as and for the purpose specified.

2. In a filter, the combination, with the body, an upper and a lower strainer located in the body, a bed of filtering material located between the two strainers, the body being open at its bottom and provided at the top with a removable head, and a tension device for the upper strainer carried by the said head, the filtering material and strainers forming an upper and a lower chamber in the said body, of a faucet connected with the upper chamber, a receptacle for sediment secured at the lower end of the body, in communication with yet independent of the lower chamber, the sediment-receptacle being provided with an outlet, a valve-casing provided with a lower and an upper seat, a valve having movement between the two seats, capable of engagement with either, a connection between the upper chamber of the body and the valve-casing above the upper valve-seat, a connection between the bottom of the valve-casing and the lower chamber in the body, and means, substantially as described, for connecting the valve-casing with a source of water-supply, as specified.

OSCAR EUGENE NICKEY.

Witnesses:
J. F. WOLCOTT,
R. D. MATTHEWS.